US006940969B2

(12) United States Patent
Chen et al.

(10) Patent No.: US 6,940,969 B2
(45) Date of Patent: Sep. 6, 2005

(54) CAPACITOR CANCELLATION METHOD AND APPARATUS

(75) Inventors: Robert Kuo-Wei Chen, North Andover, MA (US); John C. Gammel, Birdsborrow, PA (US); Dewayne Alan Spires, Plaistow, NH (US)

(73) Assignee: Legerity, Inc., Austin, TX (US)

( * ) Notice: Subject to any disclaimer, the term of this patent is extended or adjusted under 35 U.S.C. 154(b) by 542 days.

(21) Appl. No.: 10/020,379

(22) Filed: Dec. 13, 2001

(65) Prior Publication Data

US 2003/0112963 A1 Jun. 19, 2003

(51) Int. Cl.[7] ............................ H04M 1/00; H04M 9/00

(52) U.S. Cl. ............................ 379/399.01; 379/399.02; 379/90.01; 379/93.05

(58) Field of Search ....................... 379/399.01–399.02; 330/177–180

(56) References Cited

U.S. PATENT DOCUMENTS

| | | | | | |
|---|---|---|---|---|---|
| 3,855,431 | A | | 12/1974 | Stewart | 179/170 NC |
| 3,867,589 | A | | 2/1975 | Junek | 179/175.31 R |
| 4,823,383 | A | * | 4/1989 | Cardot et al. | 379/399.01 |
| 4,899,382 | A | * | 2/1990 | Gartner | 379/399.01 |
| 6,137,880 | A | * | 10/2000 | Bella | 379/399.01 |
| 6,295,343 | B1 | * | 9/2001 | Hjartarson et al. | 379/399.01 |
| 6,418,221 | B1 | | 7/2002 | Snow et al. | 379/399.01 |
| 2002/0181367 | A1 | * | 12/2002 | Bolla et al. | 379/399.01 |

* cited by examiner

*Primary Examiner*—Sinh Tran
*Assistant Examiner*—Ramnandan Singh
(74) *Attorney, Agent, or Firm*—Steve Mendelsohn; Yuri Gruzdkov

(57) ABSTRACT

A capacitor cancellation method and apparatus for use in an interface circuit having a transformer blocking capacitor. The method includes sensing a voltage across the transformer blocking capacitor and generating a cancellation signal to compensate for the effect of the transformer blocking capacitor. The apparatus includes a sensor to sense a differential voltage across the transformer blocking capacitor to develop a capacitor signal and an amplifier to amplify the capacitor signal to obtain a cancellation signal.

29 Claims, 9 Drawing Sheets

CAPACITOR CANCELLATION METHOD AND APPARATUS

FIELD OF THE INVENTION

The present invention relates to telecommunications and, more particularly, to a method and apparatus for canceling the effect of a transformer blocking capacitor on impedance in an interface circuit.

BACKGROUND OF THE INVENTION

FIG. 1 illustrates a telephone service arrangement between a subscriber 10 (e.g., a residential or commercial telephone customer) and a service provider 12 that exchanges data with a telephone company central office (TCCO) 14 to provide telephone service to the subscriber 10. There are many telecommunication standards that the service provider 12 should comply with to insure compatibility between telecommunication devices at the subscriber 10 and the service provider 12.

One of the standards with which the service provider 12 should comply is the Telcordia Standard TR-NWT-000057 (referred to herein as the "Telcordia Standard"), which specifies the impedance level a telecommunication device at the subscriber 10 should encounter when a connection is established with the service provider 12. According to the Telcordia Standard, this impedance level is 900 Ω+2.16 μF as viewed by the subscriber 10 between the tip line 16 and ring line 18 (referred to herein as the tip/ring lines 20). Telecommunication devices for use at the subscriber 10 are designed based on the impedance level set forth in the Telcordia Standard and, therefore, if the impedance of the tip/ring lines 20 deviates from this standard, telephone service may be affected adversely.

In traditional audio only telephone service arrangements (i.e., plain old telephone service, "POTS"), a subscriber line interface card (SLIC) 22 and a coder/decoder (CODEC) 24 generate a suitable impedance level between the tip/ring lines 20. The CODEC 24 develops a signal based on an output from the SLIC 22 at port VTX that reflects current sensed by the SLIC 22 at protected tip (PT) port and protected ring (PR) port. The developed signal can be fed back to the tip/ring lines 20 via the SLIC ports PT and PR to synthesize an impedance that complies with the Telcordia Standard, i.e., 900 Ω+2.16 μF. In a typical arrangement, the SLIC 22 receives the signal from the CODEC 24 through a non-inverting receive AC signal input (RCVP) and an inverting receive AC signal input (RCVN).

Recently, asynchronous digital subscriber line (ADSL) has become a common standard for transferring data at a very high rate between the subscriber 10 and the TCCO 14. ADSL service is provided over the same tip/ring lines 20 as POTS. The ADSL signals are transmitted in a frequency band above about 25 kHz, whereas traditional POTS signals are transmitted in a frequency band below about 4 kHz.

FIG. 2 illustrates an interface within a service provider 12 (FIG. 1) for separating ADSL and POTS signals received from the subscriber 10 for transmission to the TCCO 14, and combining ADSL and POTS signals received from the TCCO 14 for transmission to the subscriber 10. The interface circuit of FIG. 2 adds a transformer 26, which contains a transformer blocking capacitor 28, to the service arrangement of FIG. 1. Ideally, the transformer 26 exhibits a low impedance to signals in the ADSL band. The transformer blocking capacitor 28 is selected to prevent low frequency signals (e.g., signals in the POTS band) from passing through the transformer 26, thereby creating a "pure" ADSL signal for processing by ADSL circuitry 30 at the service provider 12 (FIG. 1). In addition, a low pass filter (LPF) 32, which contains a coupled inductor 34 and a capacitor 36, is added to filter out signals in the ADSL band, thereby creating a "pure" POTS signal for processing by the SLIC 22 and CODEC 24. A first resistor 38 is coupled between the PT port of the SLIC 22 and the LPF 32 and a second resistor 40 is coupled between the PR port of the SLIC 22 and the LPF 32 to provide protection for the SLIC 22. Also, a first protection circuit 42 and a second protection circuit 44 are coupled between the SLIC 22 and the tip/ring lines 20 to protect the SLIC 22 from voltage spikes created by the coupled inductor 34 of the LPF 32.

A problem that arises when the transformer 26 containing the transformer blocking capacitor 28 is inserted into the traditional POTS circuitry is that, at higher frequencies of the POTS band, e.g., above about 2 kHz, the transformer blocking capacitor 28 begins to pass AC current. Because current begins to flow through the transformer blocking capacitor 28 at these frequencies, the impedance of the tip/ring lines 20 is essentially the impedance developed by the CODEC 24 and SLIC 22 in parallel with the impedance of the transformer blocking capacitor 28. (The impedance through the windings of the transformer 26 is essentially zero at these frequencies.) This reduces the impedance of the tip/ring lines 20 at these higher POTS band frequencies, thereby adversely affecting the quality of the POTS.

Accordingly, methods and apparatuses are needed to compensate for the transformer blocking capacitor's effect on impedance for signals having frequencies in the POTS band, while not affecting the impedance for signals having frequencies in the ADSL band.

SUMMARY OF THE INVENTION

The present invention provides a method and apparatus for cancelling a portion of the effect of a transformer blocking capacitor within a transformer of an interface circuit on signals having frequencies in the POTS band. The method and apparatus overcome the aforementioned problems by sensing a differential voltage across the transformer blocking capacitor, developing a cancellation signal based on the differential voltage, and placing the cancellation signal on the tip/ring lines to compensate for the effects of the transformer blocking capacitor. In addition, the present invention provides for an impedance regulation method and apparatus for regulating the impedance on the tip/ring lines that incorporates the cancellation method and apparatus.

One aspect of the present invention is a method for compensating for a portion of the effect of a transformer blocking capacitor in an interface circuit on the impedance between tip/ring lines. The method comprises sensing a differential voltage across the transformer blocking capacitor, generating a cancellation signal based on the differential voltage, the cancellation signal comprising frequencies below a predetermined frequency, and adding the capacitor cancellation signal to the tip/ring lines to compensate for a portion of the effect of the transformer blocking capacitor on the impedance between the tip/ring lines below the predetermined frequency.

Another aspect of the invention is an apparatus for compensating for the effect of a transformer blocking capacitor in an interface circuit on the impedance between tip/ring lines. The apparatus comprises a sensor to sense a differential voltage across the transformer blocking capacitor and develop a capacitor voltage signal from the sensed differential voltage and an amplifier to amplify the capacitor voltage signal to obtain a cancellation signal, the cancellation signal cancelling a portion of the transformer blocking capacitor's effect on impedance when added to the tip/ring lines.

DETAILED DESCRIPTION OF THE INVENTION

Figure 3:
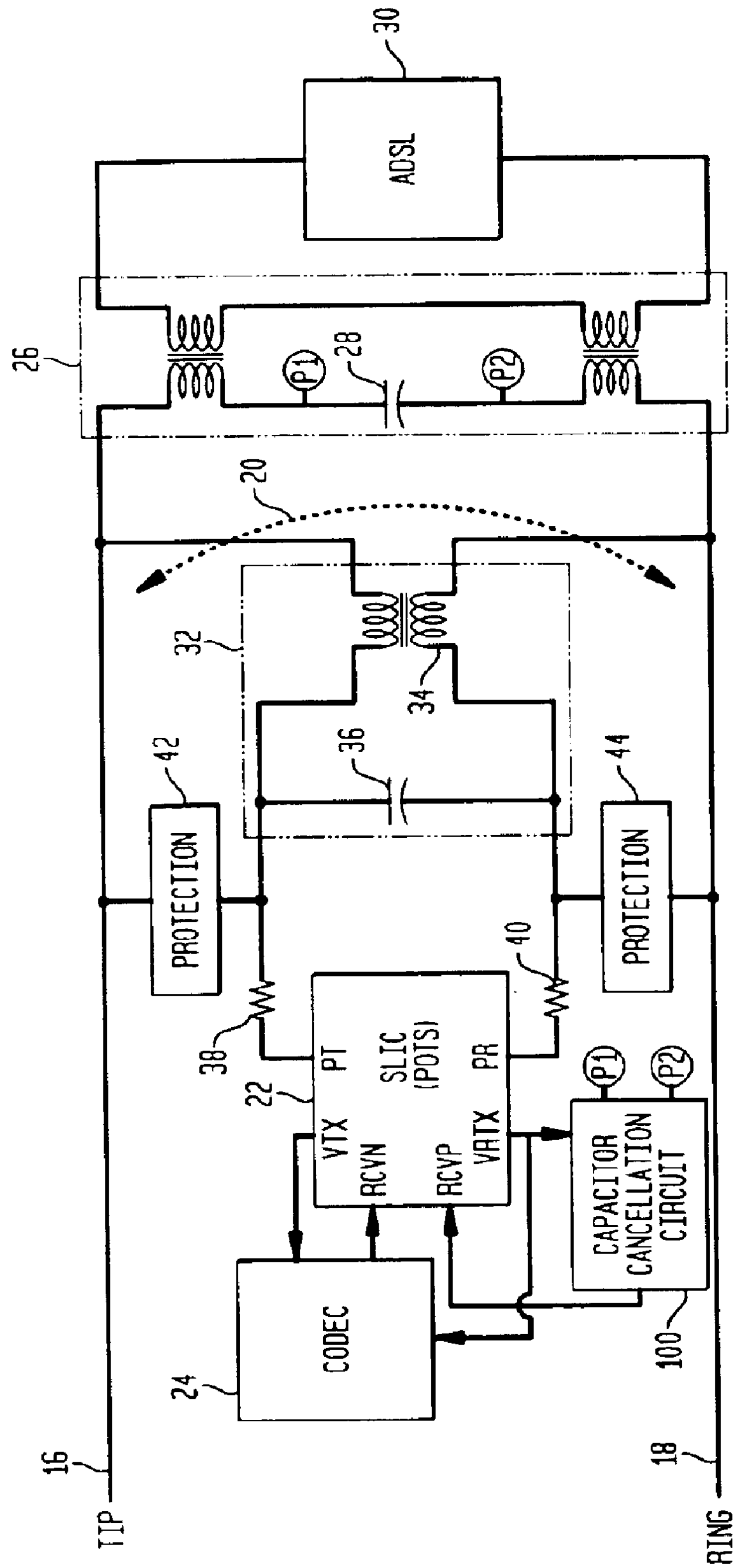
FIG. 3 is a block diagram of a interface circuit having a capacitor cancellation circuit for passing POTS band and ADSL band signals in accordance with the present invention.

FIG. 3 depicts an embodiment of an interface circuit for use at a service provider in accordance with the present invention. In general, the interface circuit includes a transformer 26 having a transformer blocking capacitor 28 for passing signals having frequencies above a predetermined frequency (e.g., signals in the ADSL frequency band), an LPF 32 for passing signals having frequencies below a predetermined frequency (e.g., signals in the POTS frequency band), a CODEC 24 for synthesizing an impedance on the tip/ring lines 20, a capacitor cancellation circuit (CCC) 100 for sensing a voltage across the transformer blocking capacitor 28 and generating a cancellation signal, and an SLIC 22 for interfacing the CODEC 24 and the CCC 100 with the tip/ring lines 20.

The transformer 26 passes signals having frequencies that are above a predetermined frequency and prevents signals having frequencies below this predetermined frequency from passing. The transformer 26 includes a transformer blocking capacitor 28, which is selected to allow the transformer 26 to pass signals with frequencies above the predetermined frequency. The transformer blocking capacitor 28 acts as an open circuit for signals having frequencies below the predetermined frequency, thereby preventing signals having frequencies below this level from passing through the transformer 26. At frequencies near the predetermined frequency, however, the transformer blocking capacitor 28 begins to pass current, thereby reducing the impedance between the tip/ring lines 20. In the illustrated embodiment, the transformer 26 is coupled between the tip line 16 and the ring line 18. In addition, the transformer 26 is coupled to ADSL circuitry 30.

In one embodiment, the transformer blocking capacitor 28 is selected to allow the transformer 26 to pass signals having a frequency above about 4 kHz for processing by the ADSL circuitry 30. Since ADSL signals have frequencies above about 25 kHz and POTS signals have frequencies below about 4 kHz, the transformer 26 in this embodiment allows only the ADSL signals to pass through to the ADSL circuitry 30. In this embodiment, the blocking capacitor 28 will begin to pass current at frequencies near 4 kHz, e.g., above about 2 kHz. The selection of a suitable transformer 26 and transformer blocking capacitor 28 for use in accordance with the present invention will be readily apparent to those skilled in the art.

The LPF 32 passes signals having frequencies that are below a predetermined frequency and prevents signals having frequencies above this predetermined frequncy from passing. In the illustrated embodiment, the LPF 32 is coupled between the tip line 16 and the ring line 18. In addition, the LPF 32 is coupled to the CODEC 24 and CCC 100 through the SLIC 22. The illustrated LPF 32 includes a coupled inductor 34 and a capacitor 36. The coupled inductor 34 and the capacitor 36 are selected in a known manner to block signals having frequencies above a predetermined frequency and pass signals having frequencies below that frequency. In one embodiment, signals in the ADSL frequency band, e.g., above about 25 kHz, are blocked while signals in the POTS frequency band, e.g., below about 4 kHz, are allowed to pass for processing by the CODEC 24 and SLIC 22. An example of a suitable coupled inductor 34 is ADSL Inductor 0560-6100-42 available from Bel Fuse Inc. of Jersey City, N.J.

The SLIC 22 is a subscriber line interface circuit. In the embodiment illustrated in FIG. 3, the SLIC 22 couples the CODEC 24 and the CCC 100 to the tip/ring lines 20 through the LPF 32. Applying a differential current to the PT port and the PR port of the SLIC 22 results in a single ended voltage signal proportional to the differential current being output at the VTX port. A signal applied on either the RCVN or RCVP ports of the SLIC 22 results in a differential voltage signal at ports PT and PR that can be used to generate a differential voltage between the tip/ring lines 20.

In one embodiment, the SLIC 22 senses the current of the tip/ring lines 20 through the PT port and PR port coupled to the tip/ring lines 20 through a pair of resistors 38 and 40 and the LPF 32. The VTX port of the SLIC 22 is coupled to the CODEC 24 for passing an output signal proportional to the difference in current between the tip/ring lines 20 to the CODEC 24, and the RCVN port of the SLIC 22 is coupled to the CODEC 24 to receive signals from the CODEC 24. The SLIC 22 also includes a reference voltage port VRTX to provide a voltage reference for other components within the interface circuit, thereby ensuring proper DC bias levels at the RCVN and RCVP ports. The SLIC 22 may be a L7585F Full-Feature, Low-Power SLIC and Switch available through Agere Systems Inc. of Allentown, Pa., USA.

The CODEC 24 processes information received from the tip/ring lines 20 and generates an impedance signal in a known manner that can be added to the tip/ring lines 20 to synthesize an impedance on the tip/ring lines 20. In the illustrated embodiment, the CODEC 24 is coupled to the tip/ring lines 20 through the SLIC 22 and LPF 32. In one embodiment, the CODEC 24 receives a signal from the VTX port of the SLIC 22 that represents the currents on the tip/ring lines 20 and generates the impedance signal in a known manner for synthesizing an impedance on the tip/ring lines 20. In conventional interface circuits, the CODEC 24 passes information to the SLIC 22 via a differential signal applied to the RCVN and RCVP ports of the SLIC 22. In the illustrated embodiment, the differential signal from the CODEC 24 is converted to a single ended signal that is passed to the RCVN port of the SLIC 22, which is described in detail further below in the description of FIG. 5. The CODEC 24 may be a programmable CODEC such as the T8531 available from Lucent Technologies, Inc.

The CCC 100 is a circuit for generating a signal to cancel a portion of the effect of the transformer blocking capacitor 28 on impedance between the tip/ring lines 20. In one embodiment, the CCC 100 senses the voltage across the transformer blocking capacitor 28 and generates a capacitor cancellation signal for canceling a portion of the effect of the transformer blocking capacitor 28 on the impedance of the tip/ring lines 20 for signals having a frequency below a predetermined frequency. In the illustrated embodiment, the CCC 100 is coupled across the transformer blocking capacitor 28 at sensing ports P1 and P2 to sense a voltage across the transformer blocking capacitor 28. A capacitor cancellation signal generated by the CCC 100 is then added to the tip/ring lines 20 through the SLIC 22 and the low pass filter 32.

In general, to remove a portion of the effect of the transformer blocking capacitor 28 on the impedance of the tip/ring lines 20, the CCC 100 effectively adds a negative capacitance to the tip/ring lines 20 having a phase and a magnitude approaching that of the opposite of the capacitance of the transformer blocking capacitor 28, thereby increasing the impedance between the tip/ring lines 20 and negating the effect of the transformer blocking capacitor 28. It should be noted that only a portion of the effect of the transformer blocking capacitor 28 is cancelled to avoid instability that may arise in the interface circuit if the capacitance of the transformer blocking capacitor 28 is negated completely. In one embodiment, the portion is at least about 90 percent, but less than 100 percent.

Figure 4:
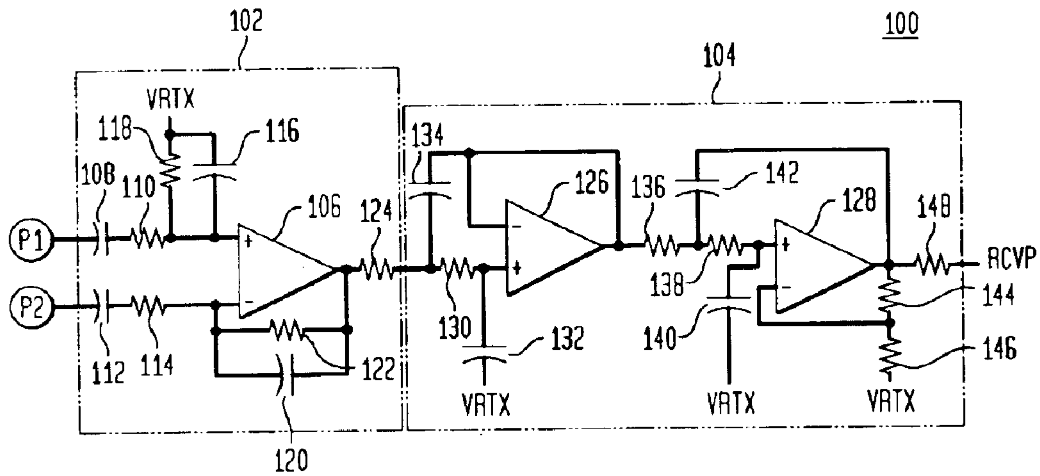
FIG. 4 is a schematic diagram of a capacitor cancellation circuit for use in the interface circuit of FIG. 3.

FIG. 4 depicts an embodiment of a CCC 100 for use in the illustrated embodiment of FIG. 3. In a general overview, the CCC 100 includes a converter 102 to convert and amplify a differential voltage sensed across the transformer blocking capacitor 28 (FIG. 3) at sensing ports P1 and P2 to generate a single ended capacitance signal, which reflects the capacitance introduced by the transformer blocking capacitor 28. The single ended capacitance signal is then passed through a low pass filter 104 to remove components of the single ended capacitance signal that are above the POTS signal band, e.g., above about 4 kHz, to prevent the interface circuit from becoming overloaded by the ADSL signal when the capacitor cancellation signal is added to the tip/ring lines 20.

In the embodiment illustrated in FIG. 4, the converter 102 comprises a conventional operational amplifier (OpAmp) 106 configured as a differential-to-single ended converter to convert a differential voltage sensed across the transformer blocking capacitor 28 at sensing ports P1 and P2 into an amplified single ended capacitance signal. The amplification (i.e., gain) of the OpAmp 106 is selected based on the value of the transformer blocking capacitor 28 (FIG. 3). In one embodiment, the appropriate amount of amplification (i.e., gain) is calculated according to the equations referenced in the description of the equivalent circuits shown in FIGS. 8 and 9.

In the illustrated embodiment, one end of the transformer blocking capacitor 28, e.g., at port P1, is coupled to the non-inverting input of the OpAmp 106 through an input capacitor 108 and an input resistor 110 and the other end of the transformer blocking capacitor 28, e.g., at port P2, is coupled to the inverting input of the OpAmp 106 through another input capacitor 112 and input resistor 114. In addition, the non-inverting input of the OpAmp 106 is coupled to the VRTX port of the SLIC 22 (FIG. 3) through a reference capacitor 116 and a reference resistor 118 connected in parallel. The output of the OpAmp 106 is fed back to the inverting input of the amplifier 106 through a feedback capacitor 120 and a feedback resistor 122. The output of the OpAmp 106 is a single ended signal that reflects the differential voltage across the transformer blocking capacitor 28, and is fed through an output resistor 124. The resistor and capacitor values of the illustrated converter 102 can be selected based on the desired gain of the converter 102 and the characteristics of the low pass filter 104 using known optimization techniques.

The LPF 104 illustrated in FIG. 4 includes a first conventional OpAmp 126 connected in series with a second conventional OpAmp 128. Each of the OpAmps 126, 128 is configured as a $2^{nd}$ order low pass filter that filters the single ended signal from the converter 102 to create the cancellation signal. Combining the OpAmps 126, 128 in series results in a $4^{th}$ order filter for filtering the single ended signal from the differential-to-single end converter 102 to remove high frequency components, e.g., frequencies above about 4 kHz, from the single ended signal. The resultant single ended signal after filtering is a cancellation signal that can be used to drive the RCVP port of the SLIC 22 to create a differential voltage that can be placed on the tip/ring lines 20 via the low pass filter 32 to cancel a portion of the transformer blocking capacitor's effect on impedance in the embodiment of FIG. 3.

In the embodiment illustrated in FIG. 4, the non-inverting input of the first OpAmp 126 is coupled to the output resistor 124 through an input resistor 130. In addition, the non-inverting input of the first OpAmp 126 is connected to the reference voltage VRTX through a reference capacitor 132. The output of the first OpAmp 126 is fed back to the inverting input of the first OpAmp 126, and is fed back to the non-inverting input through a feedback capacitor 134 and the input resistor 130. The output of the OpAmp 126 is passed through an output resistor 136 for connection with the second OpAmp 128. The non-inverting input of the second OpAmp 128 is connected to the output resistor 136 of the first OpAmp 126 through an input resistor 138. In addition, the non-inverting input of the second OpAmp 128 is connected to the VRTX port of the SLIC 22 (FIG. 3) through a reference capacitor 140. The output of second OpAmp 128 is fed back to the non-inverting input of the second OpAmp 128 through a feedback capacitor 142 and the input resistor 138 and is fed back to an inverting input of the second OpAmp 128 through a feedback resistor 144. In addition, the output of the second OpAmp 128 connected to the reference voltage VRTX through the feedback resistor 144 and a reference resistor 146. The output of the second OpAmp 128 is fed through an output resistor 148 to drive the RCVP port of the SLIC 22. The resistor and capacitor values for the illustrated LPF 104 can be selected during the optimization used to determine the resistor and capacitor values for the converter 102.

The output resistor 148 protects the SLIC 22 from potentially damaging current levels. For example, if the OpAmps 106, 126, and 128 are powered by a ±12V source and the voltage at the RCVP port should not exceed 5V, the output resistor 148 protects the RCVP port from potentially damaging current levels generated by the OpAmps 106, 126, and 128 that could damage the SLIC 22.

Figure 2:
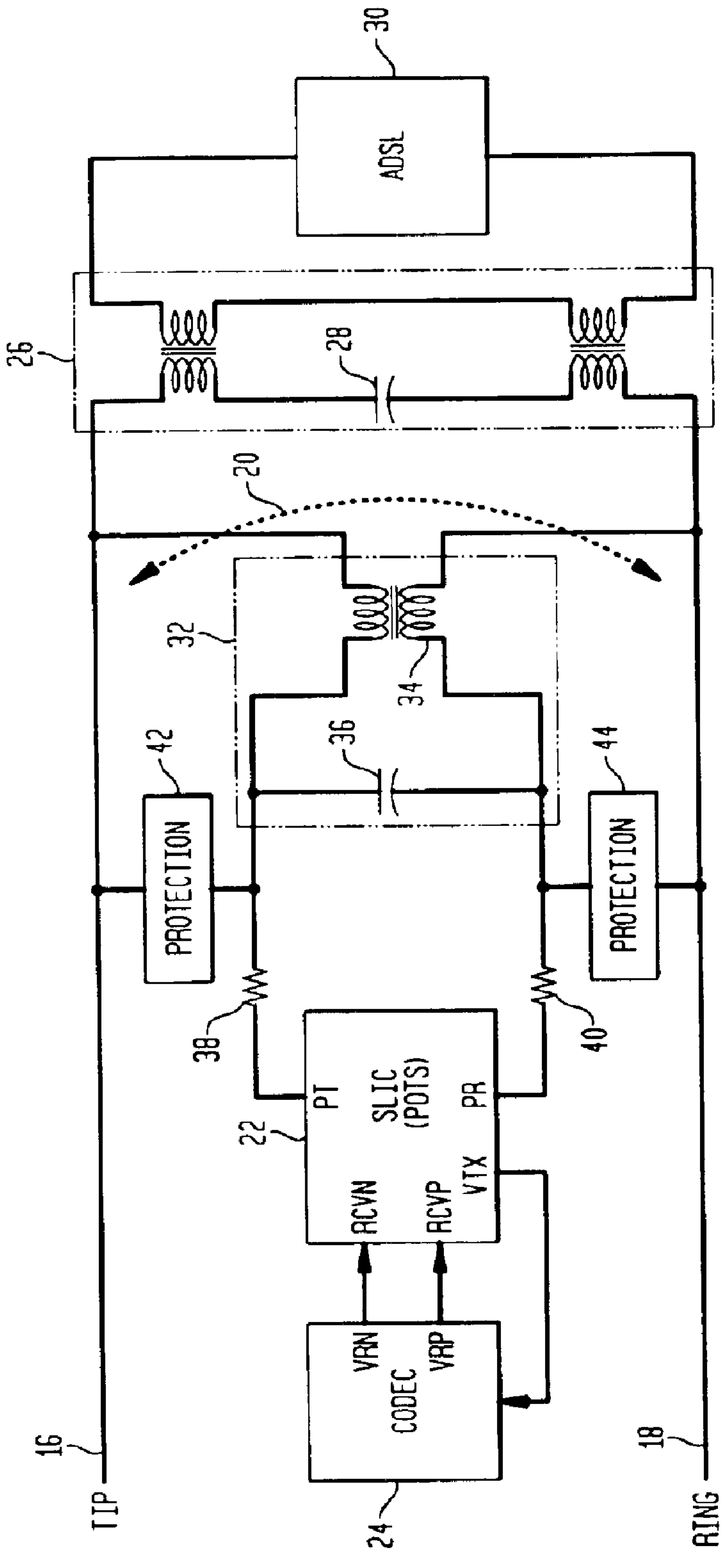
FIG. 2 is a block diagram of a prior art interface circuit for passing POTS band and ADSL band signals.
Figure 5:
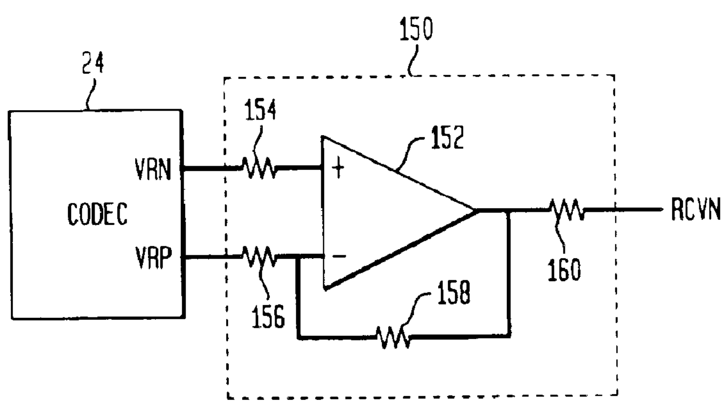
FIG. 5 is a schematic diagram of a CODEC interface for use in the interface circuit of FIG. 3.

FIG. 5 depicts one embodiment for connecting the CODEC 24 to the SLIC 22 in accordance with the illustrated embodiment depicted in FIG. 3. In FIG. 3, the CCC 100 is coupled to the SLIC 22 through the RCVP port, which is one of two connections used to couple a pair of differential signals out of the CODEC 24 to the SLIC 22 in conventional interface circuits such as the prior art circuit depicted in FIG. 2. To create a single ended output that can be coupled to the remaining RCVN port, the differential output of the CODEC 24 is passed to a differential-to-single end converter 150. The single ended output of the differential to single end converter 150 is then used to drive the RCVN port of the SLIC 22. In an alternative embodiment, the CODEC 24 may be configured to develop a single ended output thereby removing the need for a separate differential to single end converter 150.

In the embodiment illustrated in FIG. 5, the differential-to-single end converter 150 comprises a conventional OpAmp 152 that is configured as a differential-to-single end converter. The non-inverting input of the OpAmp 152 is connected to one output of the CODEC 24 through an input resistor 154 and the inverting input of the OpAmp 152 is connected to the other output of the CODEC 24 through another input resistor 156. The output of the OpAmp 152 is fed back to the inverting input of the OpAmp 152 through a feedback resistor 158. The output of the OpAmp 152 passes a single ended signal through an output resistor 160 that can be used to drive the RCVN port of the SLIC 22. The output resistor 160 protects the SLIC 22 from potentially damaging current levels. For example, if the OpAmp 152 is powered by a ±12V source and the voltage at the RCVN port should not exceed 5V, the output resistor 160 protects the RCVN port from potentially damaging current levels generated by the OpAmp 152 that could damage the SLIC 22. Resistor and capacitor values can be determined using known optimization techniques.

In use, the interface circuit depicted in FIG. 3 regulates the impedance of the tip/ring lines 20. The SLIC 22 senses a differential current on the tip/ring lines 20, via the PT and PR ports, and passes a voltage, via the VTX port, to the CODEC 24. The CODEC 24 generates an impedance voltage level that can be used to develop the impedance between the tip/ring lines 20. The SLIC 22 then generates a differential voltage at the PT and PR ports based on the impedance voltage from the CODEC 24, thereby synthesizing an impedance on the tip/ring lines 20 through the LPF 32. Meanwhile, the CCC 100 senses a differential voltage across the transformer blocking capacitor 28 and generates a cancellation signal that reflects the capacitance introduced to the interface circuit by the transformer blocking capacitor 28. The cancellation signal is passed to the SLIC 22 via the RCVP port. The SLIC 22 gererates a differential voltage on the PT and PR ports reflecting the cancellation signal that is placed on the tip/ring lines 20 through the LPF 32, thereby cancelling the transformer blocking capacitor's effect on the impedance of the tip/ring lines 20. Since the impedance signal generated by the CODEC 22 and the cancellation signal generated by the CCC 100 are both fed through the SLIC 22 to be placed on the tip/ring lines, the SLIC 22 effectively combines the two signals. In addition, because the cancellation signal generated by the CCC 100 results in ports PT and PR reflecting the cancellation signal, the CODEC 24 will sense components of the cancellation signal. An analysis of the CCC effect on canceling the transformer blocking capacitor's effect on impedance, taking a feedback loop containing the CODEC 24 into consideration, is described in reference to FIG. 11 below.

Figure 6:
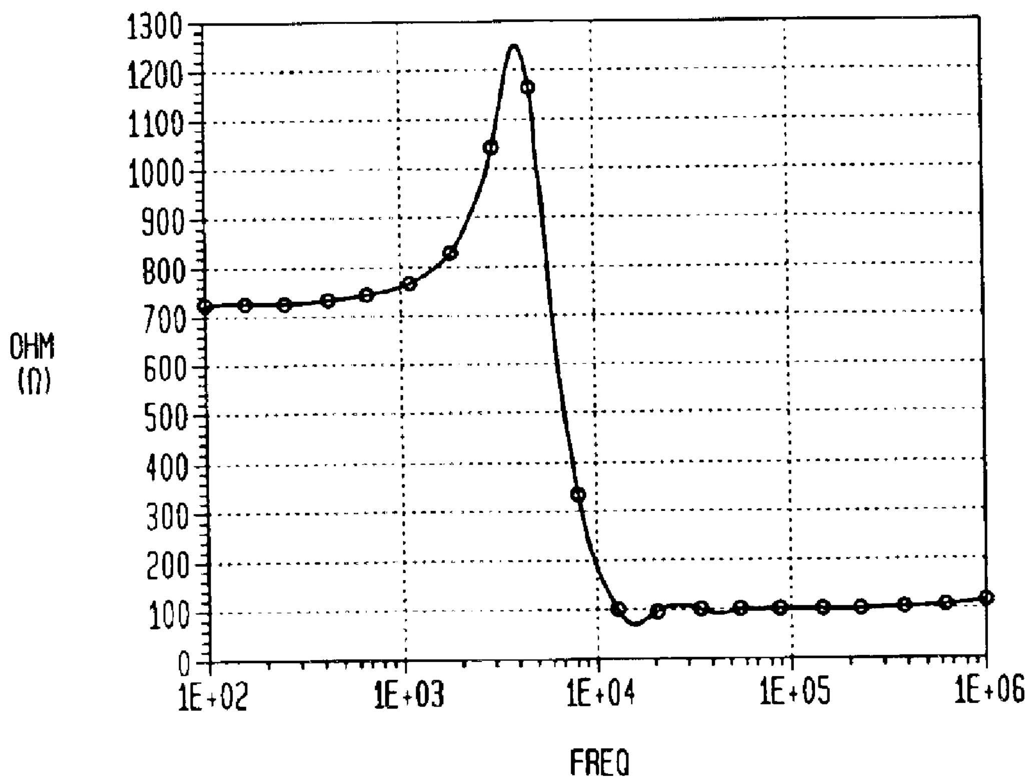
FIG. 6 is a graph depicting the tip/ring line impedance of the interface circuit of FIG. 3.
Figure 7:
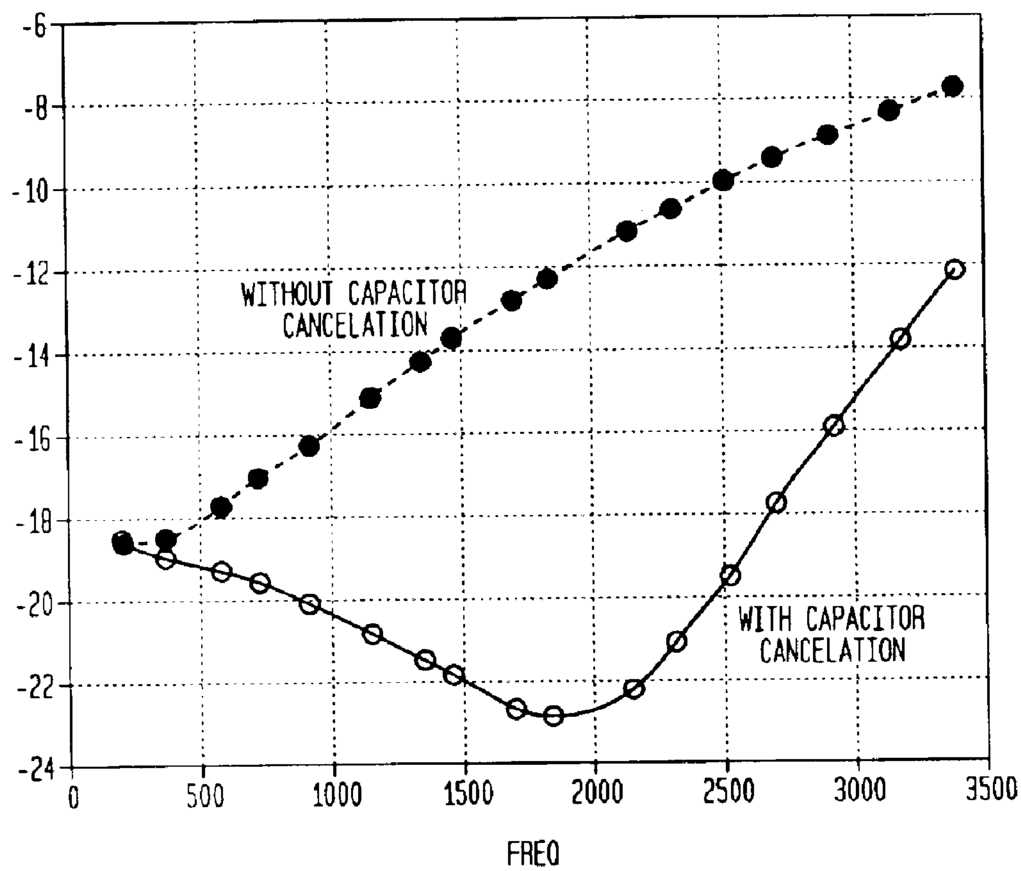
FIG. 7 is a graph depicting the return loss of the interface circuit of FIG. 3 measured against a 900 Ω termination impedance.

FIG. 6 is a graph depicting a typical impedance level in Ohms (Ω) versus frequency in Hertz (Hz) at the tip/ring lines 20 for the circuit of FIG. 3 with capacitor cancellation being performed by the CCC 100, SLIC 22, and CODEC 24. FIG. 7 is a graph depicting a typical return loss versus frequency in Hz at the tip/ring lines 20 measured against a 900 Ω termination impedance for the circuit of FIG. 3 with and without capacitor cancellation. Component values for the circuits depicted in FIGS. 3–5, which yield the results depicted in FIGS. 6 and 7, were selected using known optimization techniques.

The known optimization techniques determine resistor and capacitor values based on parameters supplied to a computer optimization program. In one embodiment, the parameters include the maximum return loss of the tip/ring lines 22 and the maximum amount of ADSL signal allowed to "leak" through the low pass filter 104 without creating noise problems in the POTS band. The maximum return loss parameter may be (1) −20 dB between 500 Hz–2.5 kHz and (2) −12 dB between 200 Hz–500 Hz and 2.5–3.4 kHz. In addition, the "leak" through parameter, given in terms of signal gain in the ADSL band (with tip/ring lines 20 as a reference), may be (1) RCVP Gain: −2 dB at 25 kHz, (2) RCVP Gain: −22 dB at 100 kHz, and (3) capacitor 36 voltage gain: 5 dB at 25 kHz.

Figure 1:
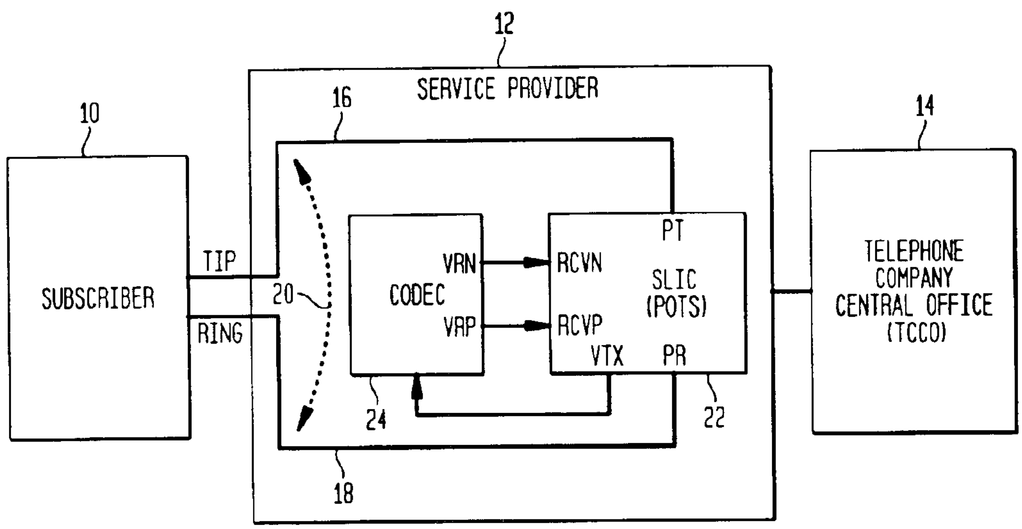
FIG. 1 is a block diagram of a prior art telephone service arrangement.
Figure 8:
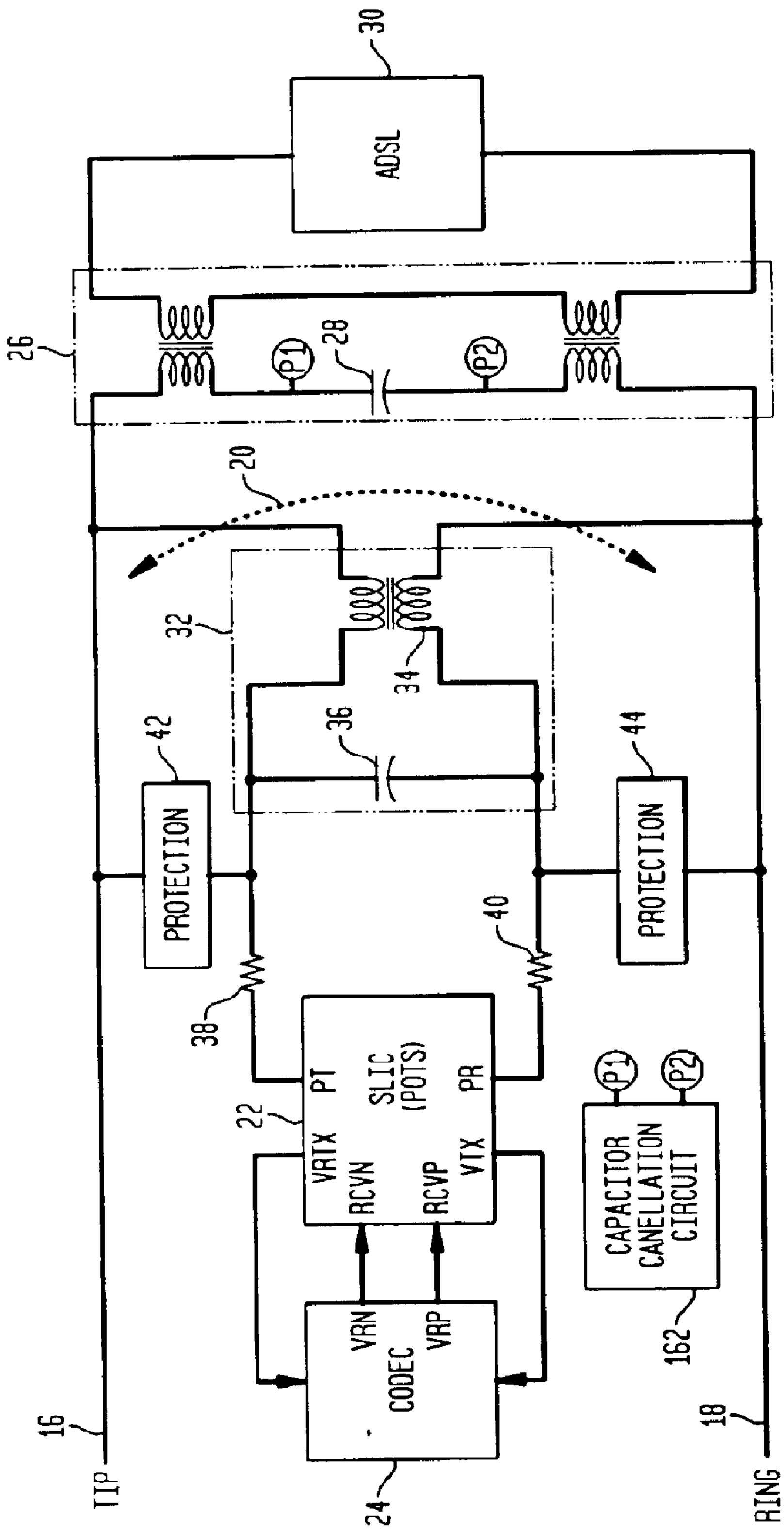
FIG. 8 is a block diagram of an alternative interface circuit having a capacitor cancellation circuit for passing POTS band and ADSL band signals in accordance with the present invention.

FIG. 8 depicts an alternative embodiment of an interface circuit for use at a service provider 20 (FIG. 1). This embodiment incorporates an alternative CCC 162 that generates a cancellation signal based on a differential voltage across the transformer blocking capacitor 28 that can be placed directly across the transformer blocking capacitor 28 to cancel a portion of the effect of the transformer blocking capacitor 28 on the impedance of the tip/ring lines 20, thereby removing the need to pass the cancellation signal through the SLIC 22. Elements that are the same as those in previous embodiments are identically labeled and a detailed description is omitted.

The CCC 162 senses the voltage across the transformer blocking capacitor 28 and generates a cancellation signal for canceling a portion of the effect of the transformer blocking capacitor 28 on the impedance of the tip/ring lines 20 for signals having a frequency below a predetermined frequency. In general, to remove a portion of the effect of the transformer blocking capacitor 28, the CCC 162 effectively adds a negative capacitance to the tip/ring lines 20 having an opposite phase and a magnitude approaching that of the capacitance of the transformer blocking capacitor 28, thereby increasing the impedance and negating the effect of the transformer blocking capacitor 28. In the illustrated embodiment, the CCC 162 is coupled across the transformer blocking capacitor 28 at sensing ports P1 and P2 to sense a voltage across the transformer blocking capacitor 28, and the cancellation signal generated by the CCC 162 is added back across the sensing ports P1 and P2. As noted previously, only a portion of the effect of the transformer blocking capacitor 28 is canceled to avoid instability in the interface circuit. A detailed description of the CCC 162 is described in reference to FIG. 9 below.

Figure 9:
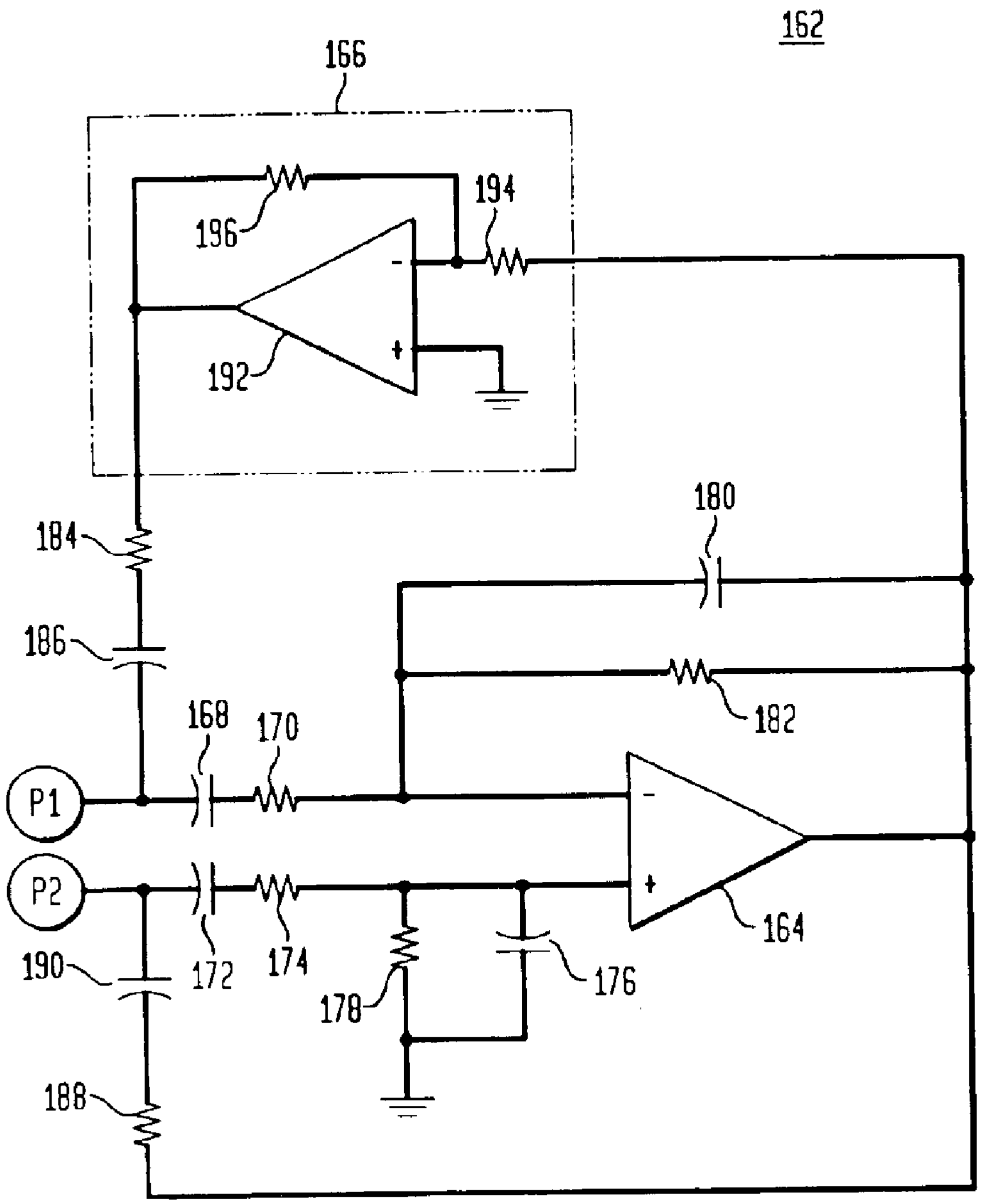
FIG. 9 is a schematic diagram on an alternative capacitor cancellation circuit for use in the interface circuit of FIG. 8.

FIG. 9 depicts an embodiment of a CCC 162 for use in the illustrated embodiment of FIG. 8. The illustrated CCC 162 includes a known OpAmp 164 and an inverter 166. The OpAmp 164 is configured to filter, amplify, and convert a differential voltage sensed across the transformer blocking capacitor 28 (FIG. 3) at sensing ports P1 and P2 to a single ended capacitance signal that reflects the capacitance of the transformer blocking capacitor 128. The capacitance signal generated by the OpAmp 164 is then passed through the inverter 166 to one of the sensing ports, e.g., P1, and is passed without inversion to the other sensing port, e.g., P2, to create a cancellation signal that can be differentially added across the transformer blocking capacitor 28 to effectively cancel a portion of the capacitance of the transformer blocking capacitor 28, thereby increasing the impedance on the tip/ring lines 20.

In the illustrated embodiment, one end of the transformer blocking capacitor 28, e.g., at P1, is coupled to the inverting input of the OpAmp 164 through an input capacitor 168 and an input resistor 170 and the other end of the transformer blocking capacitor 28, e.g., at P2, is coupled to the non-inverting input of the OpAmp 164 through another input capacitor 172 and input resistor 174. The non-inverting input of the OpAmp 164 is also connected to ground through a ground capacitor 176 and a ground resistor 178 connected in parallel. The output of the OpAmp 164 is fed back to the inverting input of the OpAmp 164 through a feedback capacitor 180 and a feedback resistor 182 connected in parallel. The output of the OpAmp 164 is also fed back to one of the sensing ports, e.g., P1, through the inverter 166 and a sensor feedback resistor 184 and capacitor 186 connected in series; and is fed back to the other sensing port, e.g., P2, through another sensor feedback resistor 188 and capacitor 190 connected in series. The amplification (i.e., gain) for the OpAmp 164 is selected based on the value of the transformer blocking capacitor 28. The appropriate amount of amplification may be calculated according to the equations in the description of FIG. 11. Values for the resistors and capacitors may be determined using known optimization techniques.

In the illustrated embodiment, the inverter 166 is a conventional OpAmp configured as an inverter. The inverting input of the OpAmp 192 is connected to the single ended output of the OpAmp 164 through an input resistor 194, the non-inverting input of the OpAmp 192 is connected to ground, and the output of the OpAmp 192 is fed back to the inverting input of the OpAmp 192 through a feedback resistor 196. The output of the OpAmp 192 is passed to one of the sensing ports, e.g., P1, through the sensor feedback resistor 184 and sensor feedback capacitor 186. Values for the resistors and capacitors may be selected using known optimization techniques.

Mathematical Support

Figure 10:
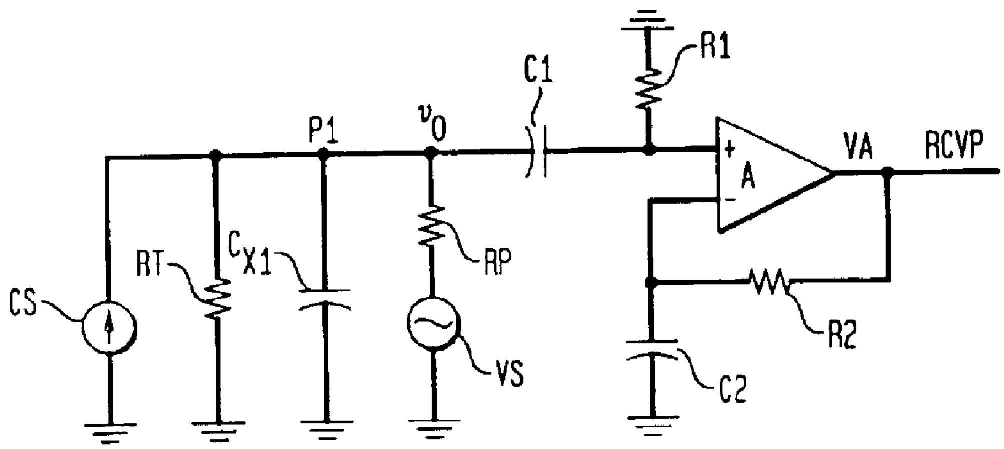
FIG. 10 is a diagram of an equivalent test circuit of the interface circuit of FIG. 3 disregarding CODEC feedback.

FIG. 10 depicts a single ended representation of the interface circuit described in FIGS. 3 and 4 ignoring the feedback loop containing the CODEC 24 (FIG. 3). The single ended representation is used for ease of description and the adequacy of its representation of the differential system described in FIGS. 3 and 4 will be readily apparent to those skilled in the art. In the representation, amplifier A represents the OpAmp 106 (FIG. 4) of the CCC 100, resistor R1 represents resistor 118, resistor R2 represents resistor 122, capacitor C1 represents capacitor 108, capacitor C2 represents capacitor 112, resistor RP represents resistor 38 (FIG. 3), voltage source VS represents the SLIC 22 having a voltage output of $2V_{RCVP}$ (e.g., for a L7585F SLIC), capacitor $C_{x1}$ represents the capacitance of blocking capacitor 28, resistor RT represents the equivalent impedance of the tip and ring lines 20, and current source CS is a one (1) amp current source incorporated to facilitate calculations.

The gain of the amplifier A is given as:

$$Gain = \frac{V_A}{V_{p1}} = \frac{R_1}{R_1 + Z_{c1}} \cdot \left(1 + \frac{R_2}{Z_{c2}}\right), \tag{1}$$

where $Z_{c1}$ is the impedance of capacitor C1 and $Z_{c2}$ is the impedance of capacitor C2.

If resistor R1 is equal to resistor R2 and capacitor C1 is equal to capacitor C2, the gain can be simplified to:

$$Gain = \frac{R_1}{Z_{c1}}. \tag{2}$$

Since the current source CS is equal to 1 amp, the following equation can be developed:

$$\frac{v_o}{R_T \| Z_{cx1}} + \frac{v_o - 2RCVP}{Z_p} = 1, \tag{3}$$

where $Z_p$ is the impedance of resistor RP and inductor 34 (FIG. 3). RCVP can be represented as:

$$RCVP = \frac{R_1}{Z_{c1}} v_o. \tag{4}$$

By substituting equation 4 into equation 3, it can then be shown that:

$$\frac{v_o}{R_{T1} \| Z_{cx1}} + v_o \left( \frac{1 - \frac{2R_1}{Z_{c1}}}{Z_p} \right) = 1; \tag{5}$$

$$v_o \left( \frac{1}{R_{T1} \| Z_{cx1}} + \frac{1}{Z_p} - \frac{2R_1}{Z_p} \frac{1}{Z_{c1}} \right) = 1; \text{ and} \tag{6}$$

$$\frac{v_o}{1} = Z_{th} = \frac{1}{\frac{1}{R_{T1} \| Z_{cx1}} + \frac{1}{Z_p} - \frac{2R_1}{Z_p} \frac{1}{Z_{c1}}}; \tag{7}$$

where $Z_{th}$ is the representation circuit's equivalent impedance.

The equivalent impedance can be rewritten as:

$$Z_{th} = \frac{1}{\frac{1}{R_T} + \frac{1}{Z_p} + \left( \frac{1}{Z_{cx1}} - \frac{2R_1}{Z_p} \frac{1}{Z_{c1}} \right)}. \tag{8}$$

If:

$$\frac{1}{Z_{cx1}} - \frac{2R_1}{Z_p} \frac{1}{Z_{c1}} = 0, \tag{9}$$

then, it can be shown that:

$$Z_{th} = R_T \| Z_p \tag{10}$$

From this analysis, it can be seen that the impedance effect of the blocking capacitor 28 represented by $Z_{Cx1}$ can be removed by the CCC 100 in FIG. 3 by developing an amplified impedance based on a voltage sensed across the blocking capacitor 28 and adding the amplified impedance to the tip/ring lines 20.

The gain of the amplifier A can be determined by rearranging equation 9 and substituting it into the gain equation of equation 1 as follows:

$$Gain = \frac{R_1}{Z_{CI}} = \frac{Z_p}{2Z_{CxI}}. \tag{11}$$

Since $Z_p$ is known, the appropriate gain for the CCC 100 can be determined once a capacitor value for $C_{X1}$ is selected.

Figure 11:
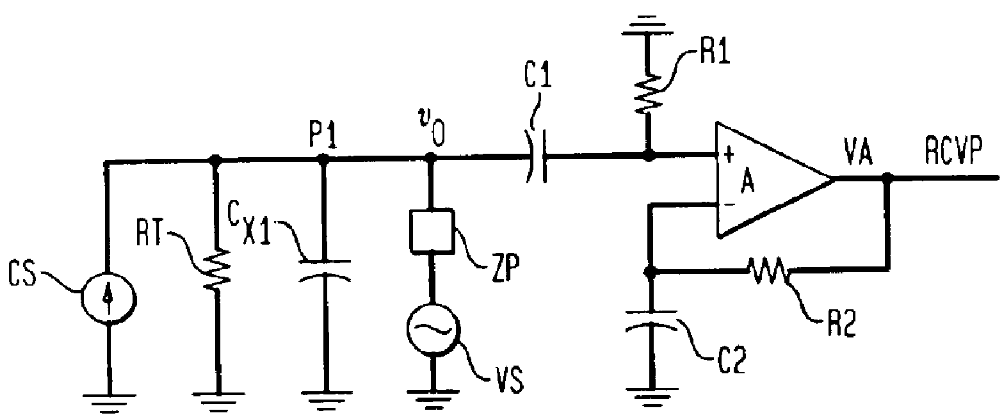
FIG. 11 is a diagram of an equivalent test circuit of the interface circuit of FIG. 3 incorporating CODEC feedback.

FIG. 11 depicts a single ended representation of the interface circuit described in FIGS. 3–5 incorporating the feedback loop containing the CODEC 24 (FIG. 3). The representation depicted in FIG. 11 is identical to the representation depicted in FIG. 10, except for the impedance $Z_p$ coupled to the voltage source VS, with elements that are the same as those in FIG. 10 being identically labeled. In the representation, the impedance $Z_p$ represents the impedance of the feedback loop containing the CODEC 24 (FIG. 3), and the voltage source VS represents the SLIC 22 having a voltage output of $2(V_{RCVP}-V_{RCVN})$. When the impedance $Z_p$ is taken into consideration, it is necessary to determine the transimpedance gain $R_f$ for PT/PR to RCVN of SLIC 22.

The transimpedance gain $R_F$ can be determined through the manipulation of an impedance synthesis equation. The impedance synthesis equation can be represented as:

$$Zth=(R_{PT}+R_{PR})+(R_{TX}*A_{CODEC}*A_{RCV}). \tag{12}$$

$R_{PT}$ is resistor 38 (FIG. 3), $R_{PR}$ is resistor 40, and $R_{TX}$ is the transimpedance gain of the SLIC 22 from a differential input current $I_{(PT,\ PR)}$ to an output voltage $V_{TX}$, i.e.,:

$$R_{TX} = \frac{V_{TX}}{I_{(PT,PR)}}. \tag{13}$$

The voltage gain of the CODEC 24 is:

$$A_{CODEC} = \frac{V_{RP} - V_{RN}}{V_{TX}}. \tag{14}$$

The receive voltage gain of the SLIC 22 is:

$$A_{RCV} = \frac{V_{PT} - V_{PR}}{V_{RCVP} - V_{RCVN}}. \tag{15}$$

If the transimpedance gain $R_F$ from the PT/PR differential current input to the $V_{RN}/V_{RP}$ differential voltage output is defined as:

$$R_f=R_{TX}*A_{CODEC}, \text{ and} \tag{16}$$

$A_{RCV}=2$, the synthesized impedance Zth can be represented as:

$$Zth=(R_{PT}+R_{PR})+2R_f. \tag{17}$$

The equations for the gain of the amplifier A are the same as equations 1 and 2 above. Since the current source CS is equal to 1 amp, the following equation can be developed:

$$\frac{V_o}{R_T \parallel Z_{cxI}} + \frac{V_o - 2(V_{RCVP} - V_{RCVN})}{Z_p} = 1 \tag{18}$$

where $Z_p$ is the synthesized impedance for the feedback loop containing the CODEC 24 (FIG. 3) and the RCVN port of SLIC 22.

$V_{RCVP}$ can be represented as:

$$V_{RCVP} = \frac{R_1}{Z_{CI}} V_o, \text{ and} \tag{19}$$

$V_{RCVN}$ can be represented as:

$$V_{RCVP} = -\frac{V_o - 2(V_{RCVP} - V_{RCVN})}{Z_p} R_f; \tag{20}$$

where $R_f$ is the transimpedance gain for PT/PR to RCVN of SLIC 22 as defined in equation 16 above. Through substitution and algebraic manipulation it can be shown that:

$$V_{RCVN} = \frac{2(V_{RCVP} - V_{RCVN}) - V_o\, R_f}{Z_p}; \tag{21}$$

$$\frac{Z_p}{R_f} V_{RCVN} = 2V_{RCVP} - 2V_{RCVN} - V_o; \text{ and} \tag{22}$$

$$\frac{Z_p}{R_f} V_{RCVN} + 2V_{RCVN} = 2V_{RCVP} - V_o; \tag{23}$$

therefore, $$V_{RCVN} = \frac{2V_{RCVP} - V_o}{\frac{Z_p}{R_f} + 2} \tag{24}$$

Looking at the second factor of equation 18, substituting the value for $V_{RCVN}$ from equation 24, it can be shown that:

$$\frac{V_o - 2(V_{RCVP} - V_{RCVN})}{Z_p} = \frac{V_o}{Z_p} - \frac{2}{Z_p}\left[V_{RCVP} - \frac{2V_{RCVP} - V_o}{\frac{Z_p}{R_f} + 2}\right]. \tag{25}$$

Through substitution and algebraic manipulation, equation 25 can be shown to equal:

$$\frac{V_o}{Z_p} - \frac{2}{Z_p}\left[\frac{V_{RCVP}\left(\frac{Z_p}{R_f} + 2\right) - 2V_{RCVP} + V_o}{\frac{Z_p}{R_f} + 2}\right] = \tag{26}$$

$$\frac{V_o}{Z_p} - \frac{2}{Z_p}\left[\frac{V_{RCVP}\left(\frac{Z_p}{R_f}\right) + V_o}{\frac{Z_p}{R_f} + 2}\right] = \tag{27}$$

$$\frac{V_o}{Z_p} - \frac{2}{Z_p}\left[\frac{\frac{R_1}{Z_{CI}}\left(\frac{Z_p}{R_f}\right) + 1}{\frac{Z_p}{R_f} + 2}\right] V_o. \tag{28}$$

Substituting equation 28 into equation 18:

$$\frac{V_o}{R_T \parallel Z_{CXI}} + \frac{V_o}{Z_p} - \frac{2}{Z_p}\left[\frac{\frac{R_1}{Z_{CI}}\left(\frac{Z_p}{R_f}\right) + 1}{\frac{Z_p}{R_f} + 2}\right] V_o = 1. \tag{29}$$

The equivalent impedance $Z_{th}$ ($V_o$ divided by 1 amp) of the representation circuit depicted in FIG. 11 can then be derived as shown in Equation 30.

$$\frac{V_o}{1} = Zth = \frac{1}{\frac{1}{R_T \parallel Z_{CX1}} + \frac{1}{Z_P} - \frac{2}{Z_P}\left[\frac{\frac{R_1}{Z_{C1}}\left(\frac{Z_P}{R_f}\right)+1}{\frac{Z_P}{R_f}+2}\right]} \tag{30}$$

Looking at the second and third factors in the denominator of equation 30:

$$\frac{1}{Z_p} - \frac{2}{Z_p}\frac{\frac{R_1}{Z_{C1}}\frac{Z_P}{R_f}+1}{\frac{Z_P}{R_f}+2}, \tag{31}$$

Through manipulation and substitution, equation 31 becomes:

$$\frac{\frac{Z_P}{R_f}+2-\frac{2R_1Z_P}{Z_{C1}R_f}-2}{Z_P\left(\frac{Z_P}{R_f}+2\right)} = \tag{32}$$

$$\frac{\frac{1}{R_f}-\frac{2R_1}{Z_{Rf}}}{\frac{Z_p+2R_f}{R_f}} = \frac{1-\frac{2R_1}{Z_{C1}}}{Z_p+2R_f}. \tag{33}$$

If the termination impedance is defined as:

$$Z_T = Z_p 2R_f. \tag{34}$$

Then it can be shown that equation 33 equals:

$$\frac{1}{Z_T} - \frac{2R_1}{Z_T}\frac{1}{Z_{C1}} \tag{35}$$

Therefore:

$$Z_{th} = \frac{1}{\frac{1}{R_T}+\frac{1}{Z_{CX1}}+\frac{1}{Z_T}-\frac{2R_1}{Z_T}\frac{1}{Z_{C1}}}: \tag{36}$$

If:

$$\frac{1}{Z_{CX1}} - \frac{2R_1}{Z_T}\frac{1}{Z_{C1}} = 0, \tag{37}$$

then $$Z_{th} = \frac{1}{\frac{1}{R_T}+\frac{1}{Z_T}} = R_T \parallel Z_T \tag{38}$$

From this analysis, it can be seen that the impedance effect of the blocking capacitor 28 represented by $Z_{CX1}$ can be removed by the CCC 100 in FIG. 3 by developing an amplified impedance based on a voltage sensed across the blocking capacitor 28 and adding the amplified impedance to the tip/ring lines 20.

The gain of the amplifier A can be determined by rearranging equation 31 and substituting it into the gain equation 1 as follows:

$$Gain = \frac{R_1}{Z_{C1}} = \frac{Z_T}{2Z_{CX1}}. \tag{39}$$

Equation 39 shows that the gain is a function of the synthesized impedance $Z_T$.

Figure 12:
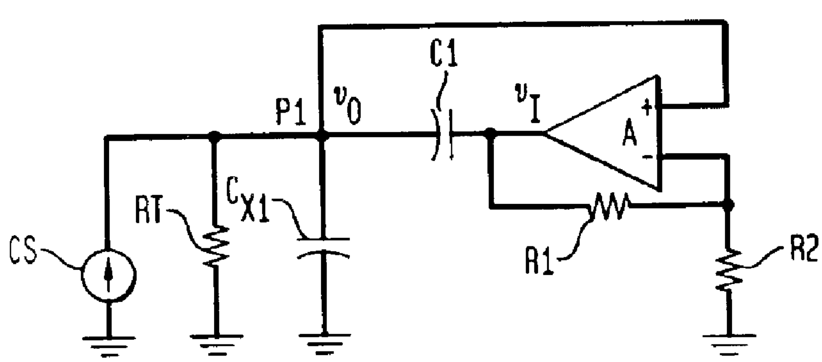
FIG. 12 is a diagram of an equivalent test circuit of the interface circuit of FIG. 8.

FIG. 12 depicts a single ended representation of the interface circuit described in FIG. 8. The single ended representation is used for ease of description and the adequacy of its representation of the differential system described in FIG. 8 will be readily apparent to those skilled in the art. In the representation depicted in FIG. 12, amplifier A represents the OpAmp 164 (FIG. 9), resistor R1 represents resistor 182, resistor R2 represents resistor 170, capacitor C1 represents capacitor 190, capacitor CX1 represents the capacitance of blocking capacitor 28, resistor RT represents the equivalent impedance of the tip and ring lines 20, and current source CS is a one (1) amp current source incorporated to facilitate calculations.

The gain of amplifier A is given as:

$$Gain = \frac{V_1}{V_0} = 1 + \frac{R_1}{R_2} \tag{40}$$

The following equation can be developed:

$$\frac{v_1 - v_o}{Z_{c1}} + 1 = \frac{v_o}{R_T \parallel Z_{cx1}}, \tag{41}$$

where $Z_{c1}$ is the impedance of capacitor C1 and $Z_{cx1}$ is the impedance of capacitor $C_{x1}$.

It can then be shown that:

$$\frac{(A-1)v_o}{Z_{c1}} + 1 = \frac{v_o}{R_T \parallel Z_{cx1}}; \tag{42}$$

$$v_o\left[\frac{A-1}{Z_{c1}} - \frac{1}{R_T \parallel Z_{cx1}}\right] = -1; \tag{43}$$

$$v_o = \frac{1}{\frac{1}{R_T \parallel Z_{cx1}} = \frac{A-1}{Z_{c1}}}; \text{ and} \tag{44}$$

$$Z_{th} = \frac{V_o}{1} = \frac{1}{\frac{1}{R_T \parallel Z_{cx1}} - \frac{1}{\frac{Z_{c1}}{A-1}}}, \tag{45}$$

where $Z_{th}$ is the representation circuit's equivalent impedance.

If the following substitution is performed:

$$\frac{Z_{c1}}{A-1} = Z_{c1'}, \tag{46}$$

then, $$Z_{th} = \frac{1}{\frac{1}{R_T}+\frac{1}{Z_{cx1}}-\frac{1}{Z_{c1'}}}. \tag{47}$$

If $1/(Z_{c1'})$is set to equal $1/(Z_{cx1})$, then:

$$Z_{th} = R_T. \tag{48}$$

From this analysis, it can be seen that the impedance effect of the blocking capacitor 28 can be removed by the CCC 162 in FIG. 8 by developing an amplified impedance based on a voltage sensed across the blocking capacitor 28 and adding the amplified impedance back across the blocking capacitor 28.

The gain of the amplifier A can be determined by substituting the criteria to set $1/(Z_{c1'})$ equal to $1/(Z_{cx1})$ into equation 41 to obtain:

$$\frac{A-1}{Z_{c1}} = \frac{1}{Z_{cx1}}; \tag{49}$$

therefore:

$$Gain = A = \frac{Z_{c1}}{Z_{cx1}} + 1. \tag{50}$$

If values are selected for C1 and CX1, the gain of the amplifier A can be determined.

Having thus described a few particular embodiments of the invention, various alterations, modifications, and improvements will readily occur to those skilled in the art. Such alterations, modifications and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

What is claimed is:

1. An interface circuit for interfacing between a pair of subscribe tip/ring lines and a central office of a telecommunications network, the interface circuit comprising:

(a) filter circuitry configured to separate low-frequency and high-frequency signals appearing on the tip/ring lines, wherein the filter circuitry comprises a blocking capacitor that affects the impedance of the tip/ring lines;

(b) high-frequency interface circuitry configured to process the high-frequency signals;

(c) low-frequency interface circuitry configured to process the low-frequency signals, wherein the low-frequency interface circuitry comprises:

(1) a subscriber line interface circuit (SLIC) configured between the tip and ring lines; and (2) a coder/decoder (CODEC) coupled to the SLIC and configured to encode and decode the low-frequency signals;

(d) a capacitor cancellation circuit (CCC) coupled across the blocking capacitor and adapted to generate a first single-ended signal, which is applied to the SLIC and coupled via the SLIC and the filter circuitry to the tip/ring lines to cancel a portion of the effect of the blocking capacitor on the impedance of the tip/ring lines.

2. The invention of claim 1, wherein the cancellation provided by the CCC provides a desired impedance between the tip/ring lines for both the low-frequency and high-frequency signals.

3. The invention of claim 2, wherein the desired impedance has a resistance of about 900 ohms and a capacitance of about 2.16 microfarads.

4. The invention of claim 1, wherein the portion canceled by the CCC corresponds to at least about 90% of the effect induced by the blocking capacitor.

5. The invention of claim 1, wherein the CCC comprises:

a first converter adapted to sense a differential voltage across the blocking capacitor and generate a single-ended capacitance signal that reflects the capacitance of the blocking capacitor; and a low-pass filter adapted to filter out components of the single-ended capacitance signal corresponding to the high-frequency signals to generate the first single-ended signal.

6. The invention of claim 5, wherein the CODEC is coupled to the SLIC via a second converter adapted to convert a pair of differential signals generated by the CODEC into a second single-ended signal applied to the SLIC.

7. The invention of claim 5, wherein the first converter comprises an operational amplifier having two inputs coupled across the blocking capacitor and an output coupled to the low-pass filter.

8. The invention of claim 7, wherein the first converter comprises:

a first capacitor and a first resistor coupled in series between a non-inverting input of the operational amplifier and a first terminal of the blocking capacitor;

a second capacitor and a second resistor coupled in series between an inverting input of the operational amplifier and a first terminal of the blocking capacitor;

a third capacitor and a third resistor coupled in parallel between the inverting input and the output of the operational amplifier; and a fourth capacitor and a fourth resistor coupled in parallel between the non-inverting input of the operational amplifier and the SLIC.

9. The invention of claim 5, wherein the low-pass filter is a forth-order filter.

10. The invention of claim 9, wherein the low-pass filter comprises two serially connected second-order filters.

11. The invention of claim 1, wherein:

the high-frequency signals correspond to DSL signals having frequencies greater than about 4 kHz;

the low-frequency signals correspond to POTS signals having frequencies less than about 4 kHz; and the filter circuitry comprises (i) a high-pass filter configured to provide the DSL signals to the high-frequency interface circuitry and (ii) a low-pass filter configured to provide the POTS signals to the low-frequency interface circuitry, wherein the blocking capacitor is part of the high-pass filter.

12. A capacitor cancellation circuit (CCC) for an interface circuit for interfacing between a pair of subscriber tip/ring lines and a central office of a telecommunications network, the interface circuit comprising:

(a) filter circuitry configured to separate low-frequency and high-frequency signals appearing on the tip/ring lines, wherein the filter circuitry comprises a blocking capacitor that affects the impedance of the tip/ring lines;

(b) high-frequency interface circuitry configured to process the high-frequncy signals;

(c) low-frequency interface circuitry configured to process the low-frequency signals, wherein the low-frequency interface circuitry comprises:

(1) a subscriber line interface circuit (SLIC) configured between the tip and ring lines; and (2) a coder/decoder (CODEC) coupled to the SLIC and configured to encode and decode the low-frequency signals;

(d) the capacitor cancellation circuit (CCC) coupled across the blocking capacitor and adapted to generate a first single-ended signal, which is applied to the SLIC and coupled via the SLIC and the filter circuitry to the tip/ring lines to cancel a portion of the effect of the blocking capacitor on the impedance of the tip/ring lines.

13. The invention of claim 12, wherein the cancellation provided by the CCC provides a desired impedance between the tip/ring lines for both the low-frequency and high-frequency signals.

14. The invention of claim 12, wherein the portion canceled by the CCC corresponds to at least about 90% of the effect induced by the blocking capacitor.

15. The invention of claim 12, wherein the CCC comprises:

a first converter adapted to sense a differential voltage across the blocking capacitor and generate a single-ended capacitance signal that reflects the capacitance of the blocking capacitor; and a low-pass filter adapted to filter out components of the single-ended capacitance signal corresponding to the high-frequency signals to generate the first single-ended signal.

16. The invention of claim 15, wherein the CODEC is coupled to the SLIC via a second converter adapted to convert a pair of differential signals generated by the CODEC into a second single-ended signal applied to the SLIC.

17. The invention of claim 15, wherein the first converter comprises an operational amplifier having two inputs coupled across the blocking capacitor and an output coupled to the low-pass filter.

18. The invention of claim 17, wherein the first converter comprises:

a first capacitor and a first resistor coupled in series between a non-inverting input of the operational amplifier and a first terminal of the blocking capacitor;

a second capacitor and a second resistor coupled in series between an inverting input of the operational amplifier and a first terminal of the blocking capacitor;

a third capacitor and a third resistor coupled in parallel between the inverting input and the output of the operational amplifier; and a fourth capacitor and a fourth resistor coupled in parallel between the non-inverting input of the operational amplifier and the SLIC.

19. The invention of claim 15, wherein the low-pass filter is a forth-order filter.

20. The invention of claim 14, wherein the low-pass filter comprises two serially connected second-order filters.

21. An interface circuit for interfacing between a pair of subscriber tip/ring lines and a central office of a telecommunications network, the interface circuit comprising:

(a) filter circuitry configured to separate low-frequency and high-frequency signals appearing on the tip/ring lines, wherein the filter circuitry comprises a blocking capacitor that affects the impedance of the tip/ring lines;

(b) high-frequency interface circuitry configured to process the high-frequency signals;

(c) low-frequency interface circuitry configured to process the low-frequency signals, wherein the low-frequency interface circuitry comprises:

(1) a subscriber line interface circuit (SLIC) configured between the tip and ring lines; and (2) a coder/decoder (CODEC) coupled to the SLIC and configured to encode and decode the low-frequency signals;

(d) a capacitor cancellation circuit (CCC) coupled across the blocking capacitor and adapted to cancel a portion of the effect of the blocking capacitor on the impedance of the tip/ring lines, wherein the CCC comprises:

an operational amplifier having (i) an inverting input coupled to a first terminal of the blocking capacitor, (ii) a non-inverting input coupled to a second terminal of the blocking capacitor, and (iii) an output coupled back to the first and second terminals of the blocking capacitor ; and an inverter coupled between the output of the operational amplifier and the first terminal of the blocking capacitor.

22. The invention of claim 21, wherein the CCC further comprises:

a first capacitor and a first resistor coupled in series between the inverting input of the operational amplifier and the first terminal of the blocking capacitor;

a second capacitor and a second resistor coupled in series between the non-inverting input of the operational amplifier and the second terminal of the blocking capacitor;

a third capacitor and a third resistor coupled in parallel between the inverting input and the output of the operational amplifier; and a fourth capacitor and a fourth resistor coupled in parallel between the non-inverting input of the operational amplifier and a ground terminal.

23. The invention of claim 22, wherein the CCC further comprises:

a fifth capacitor and a fifth resistor coupled in series between the output of the operational amplifier and the second terminal of the blocking capacitor; and a sixth capacitor and a sixth resistor coupled in series between the inverter and the first terminal of the blocking capacitor.

24. The invention of claim 21, wherein the cancellation provided by the CCC provides a desired impedance between the tip/ring lines for both the low-frequency and high-frequency signals.

25. The invention of claim 24, wherein the desired impedance has a resistance of about 900 ohms and a capacitance of about 2.16 microfarads.

26. The invention of claim 21, wherein the portion canceled by the CCC corresponds to at least about 90% of the effect induced by the blocking capacitor.

27. The invention of claim 21, wherein:

the high-frequency signals correspond to DSL signals having frequencies greater than about 4 kHz;

the low-frequency signals correspond to POTS signals having frequencies less than about 4 kHz; and the filter circuitry comprises (i) a high-pass filter configured to provide the DSL signals to the high-frequency interface circuitry and (ii) a low-pass filter configured to provide the POTS signals to the low-frequency interface circuitry, wherein the blocking capacitor is part of the high-pass filter.

28. A capacitor cancellation circuit (CCC) for an interface circuit for interfacing between a pair of subscriber tip/ring lines and a central office of a telecommunication network, the interface circuit comprising:

(a) filter circuitry configured to separate low-frequency and high-frequency signals appearing on the tip/ring lines, wherein the filter circuitry comprises a blocking capacitor that affects the impedance of the tip/ring lines;

(b) high-frequency interface circuitry configured to process the high-frequency signals;

(c) low-frequency interface circuitry configured to process the low-frequency signals, wherein the low-frequency interface circuitry comprises:

(1) a subscriber line interface circuit (SLIC) configured between the tip and ring lines; and (2) a coder/decoder (CODEC) coupled to the SLIC and configured to encode and decode the low-frequency signals;

(d) the capacitor cancellation circuit (CCC) coupled across the blocking capacitor and adapted to cancel a portion of the effect of the blocking capacitor on the impedance on the tip/ring lines, wherein the CCC comprises:

an operational amplifier having (i) an inverting input coupled to a first terminal of the blocking capacitor, (ii) a non-inverting input coupled to a second terminal of the blocking capacitor, and (iii) an output coupled back to the first and second terminals of the blocking capacitor; and an inverter coupled between the output of the operational amplifier and the first terminal of the blocking capacitor.

29. The invention of claim 28, wherein the CCC further comprises:

a first capacitor and a first resistor coupled in series between the inverting input of the operational amplifier and the first terminal of the blocking capacitor;

a second capacitor and a second resistor coupled in series between the non-inverting input of the operational amplifier and the second terminal of the blocking capacitor;

a third capacitor and a third resistor coupled in parallel between the inverting input and the output of the operational amplifier; and a fourth capacitor and a fourth resistor coupled in parallel between the non-inverting input of the operational amplifier and a ground terminal.

* * * * *